No. 631,445. Patented Aug. 22, 1899.
C. S. SMITH.
ADJUSTABLE CONE FASTENING FOR BALL BEARING AXLES.
(Application filed May 21, 1898.)
(No Model.)

Witnesses:
Geo. W. Young.
Chas. L. Goss.

Inventor:
Charles S. Smith,
By Winkler Flanders Smith Bottum Vilas
Attorneys.

UNITED STATES PATENT OFFICE.

CHARLES S. SMITH, OF MILWAUKEE, WISCONSIN, ASSIGNOR TO THE PREMIER MANUFACTURING COMPANY, OF HARTFORD, CONNECTICUT.

ADJUSTABLE CONE-FASTENING FOR BALL-BEARING AXLES.

SPECIFICATION forming part of Letters Patent No. 631,445, dated August 22, 1899.

Application filed May 21, 1898. Serial No. 681,391. (No model.)

*To all whom it may concern:*

Be it known that I, CHARLES S. SMITH, a citizen of the United States, residing at Milwaukee, in the county of Milwaukee and State of Wisconsin, have invented certain new and useful Improvements in Adjustable Cone-Fastenings for Ball-Bearing Axles, of which the following is a specification, reference being had to the accompanying drawings, forming a part thereof.

The main object of my invention is to provide an adjustable cone-fastening for ball-bearing axles that will be secure and reliable in use and that will bring into service a different bearing-surface whenever the cone is adjusted, thus tending to make the cone wear more evenly and longer.

It consists of certain novel features of construction and combinations of parts hereinafter particularly described, and pointed out in the claims.

In the accompanying drawings like letters designate the same parts in the several figures.

Figure 1:
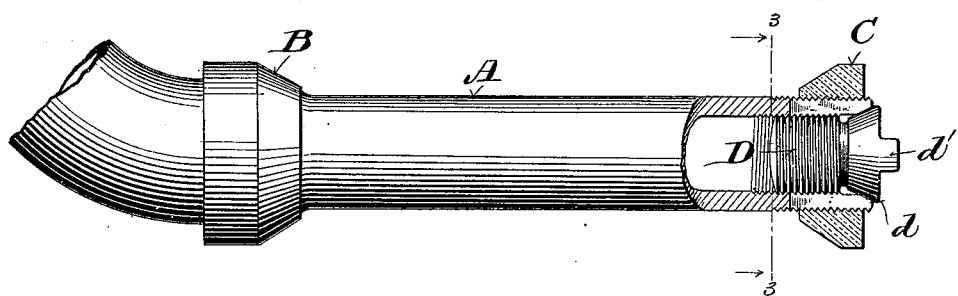
Figure 2:
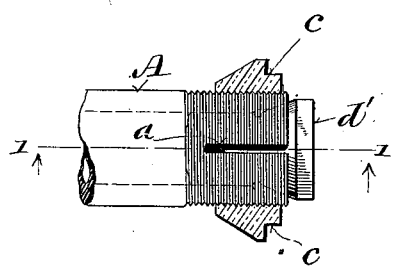
Figure 3:
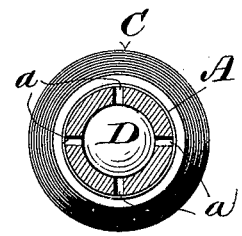

Figure 1 is a view, partly in side elevation and partly in axial section, on the line 1 1, Fig. 2, of an axle-spindle to which my improved adjustable cone-fastening is applied. Fig. 2 is a plan view of the threaded end of the spindle, the outside cone being shown in section; and Fig. 3 is a cross-section of the axle-spindle on the line 3 3, Fig. 1, showing the fastening in end elevation, looking from the center of the axle.

A represents the spindle of a vehicle-axle, which in the present instance is shown as of tubular form throughout, although it may be made solid except at the outer end, which must be tubular or bored out and threaded axially to receive the expanding-screw of the cone-fastening. B designates the inside cone, and C the outside cone, which is threaded upon the outer end of said spindle. The spindle has in its outer end one or more longitudinal saw cuts or slits $a$, whereby it is made expansible and contractible.

D is a screw threaded in the bore of the axle and provided with a tapering or cone-shaped head $d$, which is fitted in a correspondingly-shaped seat in the outer end of the axle-spindle, as shown in Fig. 1. The cone C and the screw D are provided with means for turning them. The cone may for this purpose be flattened on opposite sides, as shown at $c\ c$ in Fig. 2, to receive a wrench, and the screw D may be formed with a wrench-head or flattened extension $d$ on its outer end, as shown in Fig. 1. The outside cone C is adjusted toward the inside cone B to take up wear by turning it up on the threaded end of the axle-spindle. To effect this, the screw D is slackened or turned out sufficiently to allow the slit portion of the spindle to contract and the cone to turn thereon. After the cone is set up and adjusted it is locked in place by tightening the screw D and expanding the threaded end of the spindle in said cone.

In devices of this class it has been customary heretofore to fit the outside cone loosely upon the axle, to hold it from turning thereon by a pin or key and keyway, and to adjust and secure it in place by a flange-bolt tapped in the axle-spindle and locked in position by a set-screw passing through the center of the same; but this method of mounting, adjusting, and fastening the cone is objectionable because the cone is not positively held in proper alinement or adjustment relative to the inside cone, and as it is not turned in its adjustment but one point or face is subjected to wear, thus causing it to soon become untrue and to work imperfectly. With my improved fastening, however, the outside cone is turned every time it is adjusted, thus bringing a new wearing point or face into play, tending to distribute the wear, preserve the proper shape, and prolong its serviceable condition.

The axle-spindle need not necessarily be formed in the outer end of its base with a tapering or cone-shaped seat for the head of the expanding-screw D, which will work without or will with use form for itself a sufficient seat.

The minor details may be modified in various ways without materially affecting the operation of the device or departing from the principle of my invention, and therefore I do not wish to be understood as limiting myself to the exact details of construction shown in the drawings and specifically described, except to the extent that they are expressly included in the claims.

I claim—

1. The combination with an axle-spindle having a threaded hole in the end which is longitudinally split and externally threaded, of an internally-threaded cone fitted to engage the external thread on said spindle, and a screw fitted to engage the threaded hole therein and having a plain cone-shaped expanding-head, substantially as and for the purposes set forth.

2. The combination with an axle-spindle having an axial hole terminating in a plain beveled or tapering seat and longitudinally split through said seat, of a cone threaded upon the split end of said spindle, and a screw threaded in said hole and having a plain cone-shaped expanding-head fitted in said tapering seat, substantially as and for the purposes set forth.

3. The combination with an internally and externally threaded tubular axle-spindle having a plain tapering seat in and longitudinally split through the end, of a cone fitted to engage the external thread, and a screw fitted to engage the internal thread of said spindle and having a plain cone-shaped expanding-head fitted in said tapering seat, said head being provided with squared or flattened faces projecting beyond the end of said axle-spindle, substantially as and for the purposes set forth.

In witness whereof I hereto affix my signature in presence of two witnesses.

CHARLES S. SMITH.

Witnesses:
 CHAS. L. GOSS,
 L. A. MORRILL.